(12) United States Patent
Shi et al.

(10) Patent No.: US 8,441,235 B2
(45) Date of Patent: May 14, 2013

(54) BATTERY CHARGER DIGITAL CONTROL CIRCUIT AND METHOD

(75) Inventors: Justin Shi, Ann Arbor, MI (US); Eric Soenen, Austin, TX (US); Alan Roth, Leander, TX (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 233 days.

(21) Appl. No.: 13/032,956

(22) Filed: Feb. 23, 2011

(65) Prior Publication Data

US 2012/0194141 A1 Aug. 2, 2012

Related U.S. Application Data

(60) Provisional application No. 61/438,067, filed on Jan. 31, 2011.

(51) Int. Cl.
*H02J 7/00* (2006.01)
*H03M 3/00* (2006.01)

(52) U.S. Cl.
USPC .......................................... 320/137; 341/143

(58) Field of Classification Search ............. 320/137; 341/143
See application file for complete search history.

(56) References Cited

U.S. PATENT DOCUMENTS

| | | | |
|---|---|---|---|
| 6,552,606 B1 | 4/2003 | Veltman et al. | |
| 6,693,400 B2 | 2/2004 | Pedrazzini et al. | |
| 6,922,470 B2 * | 7/2005 | Betty et al. | 379/413 |
| 6,952,131 B2 | 10/2005 | Jeong et al. | |
| 7,119,525 B1 | 10/2006 | Yoshino | |
| 7,200,187 B2 | 4/2007 | O'Brien | |
| 7,239,116 B2 | 7/2007 | Tang | |
| 7,276,963 B2 | 10/2007 | Wegner | |
| 7,391,197 B2 | 6/2008 | Chang et al. | |
| 7,394,314 B2 | 7/2008 | May | |
| 7,428,159 B2 | 9/2008 | Leung et al. | |
| 7,459,864 B2 | 12/2008 | Lys | |

(Continued)

FOREIGN PATENT DOCUMENTS

| | | |
|---|---|---|
| CN | 16 181 68 A | 5/2005 |
| CN | 1780131 A | 5/2006 |

(Continued)

OTHER PUBLICATIONS

Reutemann, R., et al., "A 33mW 14b 2.5MSample/s ΣΔ A/D Converter in 0.25 μm Digital CMOS," IEEE ISSCC 2002, Session 18, Converter Techniques, 18.6, 3 pages.

(Continued)

*Primary Examiner* — M'Baye Diao
(74) *Attorney, Agent, or Firm* — Slater & Matsil, L.L.P.

(57) ABSTRACT

A digital controlled battery charger comprises a power converter, a voltage sensor, a current senor, a mode selector and a digital controller. The voltage sensor and current sensor detect the voltage of a rechargeable battery and the current flowing through the rechargeable battery respectively. The mode selector selects a feedback signal from either the output of the voltage sensor or the output of the current sensor. The digital controller receives the selected feedback signal and generates a pulse width modulated signal for the power converter. Additionally, the digital controller is capable of dynamically adjusting its coefficients so that the control loop can maintain a stable system when the battery charger operates in different battery charging phases.

22 Claims, 5 Drawing Sheets

U.S. PATENT DOCUMENTS

| | | | |
|---|---|---|---|
| 7,512,504 B2 * | 3/2009 | Sutardja | 702/65 |
| 7,834,591 B2 * | 11/2010 | Hussain et al. | 320/137 |
| 7,834,604 B2 | 11/2010 | Soenen et al. | |
| 8,085,869 B2 * | 12/2011 | Behzad | 375/297 |
| 8,212,390 B1 * | 7/2012 | Robinson et al. | 307/31 |
| 2003/0174005 A1 | 9/2003 | Latham, II et al. | |
| 2003/0197635 A1 * | 10/2003 | Mueck et al. | 341/155 |
| 2006/0220938 A1 | 10/2006 | Leung et al. | |
| 2007/0036212 A1 * | 2/2007 | Leung et al. | 375/238 |
| 2008/0129264 A1 | 6/2008 | Moussaoui et al. | |
| 2009/0237959 A1 | 9/2009 | Soenen et al. | |
| 2009/0267571 A1 * | 10/2009 | Wolf et al. | 320/162 |

FOREIGN PATENT DOCUMENTS

| | | |
|---|---|---|
| CN | 19 252 92 A | 3/2007 |
| CN | 1930541 A | 3/2007 |
| KR | 20000032770 A | 6/2000 |
| KR | 20070082541 A | 6/2000 |
| KR | 20070020315 A | 2/2007 |
| WO | WO 2005/081770 A2 | 9/2005 |

OTHER PUBLICATIONS

United States Patent and Trademark Office, Office Action, U.S. Appl. No. 12/134,930, Mar. 4, 2010, 5 pages.

Zhu, C., "The Buck Converter and the Design of Power Managing Chip," Masters Thesis, Jilin University, Jun. 2004-Apr. 2006, pp. i-iv, 1-61.

Texas Instruments, "DC/DC Converters (Integrated Switch)—Step-Down Regulators"—TPS62000, http://focus.ti.com/docs/prod/folders/print/tps62000.html, Texas Instruments Incorporated, Dallas, TX, 4 pages, downloaded Jun. 4, 2010.

Texas Instruments, "DC/DC Converters (Integrated Switch)—Step-Down Regulators"—TPS62040, http://focus.ti.com/docs/prod/folders/print/tps62040.html, © 1995-2010, Texas Instruments Incorporated, Dallas, TX, 5 pages, downloaded Jun. 4, 2010.

Texas Instruments, "DC/DC Converters (Integrated Switch)—Step-Down Regulators"—TPS62220, http://focus.ti.com/docs/prod/folders/print/tps62220.html, © 1995-2010, Texas Instruments Incorporated, Dallas, TX, 5 pages, downloaded Jun. 4, 2010.

Texas Instruments, "DC/DC Converters (Integrated Switch)—Step-Down Regulators"—TPS62260, http://focus.ti.com/docs/prod/folders/print/tps62260.html, © 1995-2010, Texas Instruments Incorporated, Dallas, TX, 6 pages, downloaded Jun. 7, 2010.

Analog Devices, ADP2102, "Low Duty Cycle, 600mA, 3MHz Synchronous Step-Down DC-to-DC Converter," http://www.analog.com/en/power-management/switching-regulators-integrated-fet-switches/ADP2102/products/product.html, 2 pages, downloaded Jun. 7, 2010.

Lukić, Z, et al., "High-Frequency Digital Controller for DC-DC Converters Based on Multi-Bit $\Sigma$-$\Delta$ Pulse-Width Modulation," 2005, IEEE, pp. 35-40.

Lukić, Z, et al., "Multibit $\Sigma$-$\Delta$ PWM Digital Controller IC for DC-DC Converters Operating at Switching Frequencies Beyond 10 MHz," IEEE Transactions on Power Electronics, vol. 22, No. 5, Sep. 2007, pp. 1693-1707.

Parayandeh, A., et al., "Programmable Analog-to-Digital Converter for Low-Power DC-DC SMPS," IEEE Transactions on Power Electronics, vol. 23, No. 1, Jan. 2008, pp. 500-505.

Dostal, F., "Emulated Ripple Technique Advances Hysteretic Switchmode Supplies," Feb. 25, 2008, Power Management DesignLine, http://www.powermanagementdesignline.com, 4 pages.

Forejt, B., et al., "A 700+-mW Class D Design With Direct Battery Hookup in a 90-nm Process," IEEE Journal of Solid-State Circuits, vol. 40, No. 9, Sep. 2005, pp. 1880-1887.

Pressman, A.I., "'Buck' Switching Regulator Topology", Switching Power Supply Design, $2^{nd}$ Ed., McGraw-Hill, © 1998, pp. 9-24.

Pressman, A.I., "Feedback-Loop Stabilization", Switching Power Supply Design, $2^{nd}$ Ed., McGraw-Hill, © 1998, pp. 427-448.

Texas Instruments, TPS62000 Data Sheet, "High-Efficiency, Step-Down, Low Power, DC-DC Converter (Rev. E)," http://focus.ti.com/docs/prod/folders/print/tps62000.html; Aug. 18, 2008, © 2000-2008, Texas Instruments Incorporated, Dallas, TX, 26 pages.

Texas Instruments, TPS62040 Data Sheet, "1.2A / 1.25 Mhz. High-Efficiency, Step-Down Converter (Rev. B)," http://focus.ti.com/docs/prod/folders/print/tps62040.html; Oct. 28, 2005, © 2003-2005, Texas Instruments Incorporated, Dallas, TX, 29 pages.

Texas Instruments, TPS62220 Data Sheet, "400-mA, 1.25-MHz High-Efficiency Step-Down Converter in Thin-SOT23 (rev.E)," http://focus.ti.com/docs/prod/folders/print/tps62000.html; Feb. 5, 2009, Copyright © 2003-2009, Texas Instruments Incorporated, Dallas, TX, 29 pages.

Texas Instruments, TPS62260 Data Sheet, "2.25MHz 600mA Step Down Converter in 2x2SON/TSOT23 Package (Rev. B)." http://focus.ti.com/docs/prod/folders/print/tps62260.html, Feb. 19, 2008, Copyright © 2007-2008, Texas Instruments Incorporated, Dallas, TX, 31 pages.

Analog Devices, ADP2102 Data Sheet, "Low Duty Cycle, 600mA, 3MHz Synchronous Step-Down DC-to-DC Converter," Rev. B, http://www.analog.com/en/power-management/switching-regulators-integrated-fet-switches/ADP2102/products/product.html, Sep. 2007, © 2007 Analog Devices, Inc., Norwood, MA, 24 pages.

Coilcraft, LPS3015 Series Data Sheet, "Low Profile Shielded Power Inductors," http://www.coilcraft.com/lps3015.cfm, Doc. 436-1, Revised Aug. 5, 2009, © Coilcraft, Inc. 2010, Cary, IL, 2 pages.

Maxim, MAX8640Y/MAX8640Z Data Sheet, "Tiny 500mA, 4MHz/2MHz Synchronous Step-Down DC-DC Converters," http://datasheets.maxim-ic.com/en/ds/MAX8640Y-MAX8640Z.pdf, 19-3997; Rev. 4; Feb. 2009, © 2009 Maxim Integrated Products, Sunnyvale, CA, pp. 1-12.

Linear Technology, LTC3614 Data Sheet, "4A, 4MHz Monolithic Synchronous Step-Down DC/DC Converter," http://cds.linear.com/docs/Datasheet/3614f.pdf, © Linear Technology Corporation 2010, Milpitas, CA, pp. 1-28.

* cited by examiner

BATTERY CHARGER DIGITAL CONTROL CIRCUIT AND METHOD

BACKGROUND

This application claims the benefit of U.S. Provisional Application No. 61/438,067 filed on Jan. 31, 2011, entitled "Battery Charger Digital Control Circuit and Method," which application is hereby incorporated herein by reference.

Rechargeable batteries include a variety of types, such as nickel-cadmium (NiCd) batteries, nickel-metal hydride (NiMH) batteries, lithium-ion batteries, lithium-ion polymer batteries, lithium-air batteries, lithium iron phosphate batteries and the like. Rechargeable batteries are used to store electrical energy. On the other hand, a battery charger is employed to charge a rechargeable battery back to a charged state after the rechargeable battery has been depleted.

Different types of rechargeable batteries may employ different charging methods. For example, when a lithium-ion polymer battery is charged from a depleted state to a full charged state, in accordance with the charging profile of lithium-ion polymer batteries, the lithium-ion polymer battery is charged initially at a low current in a pre-conditioning phase. After the voltage of the battery reaches a minimum charge voltage threshold, the battery charging cycle enters a current regulation phase in which the battery is charged at a constant current. In such a current regulation phase, the voltage of the battery keeps rising until the voltage reaches a specified regulation voltage. Subsequently, the battery charging cycle enters a voltage regulation phase by changing the battery charger from a constant current source to a constant voltage source. During the voltage regulation phase, the battery's voltage is held at the specified voltage. Consequently, the charging current gradually decreases. When the charging current is smaller than a specified current value, the battery charging cycle is complete.

Two types of battery chargers are well known and commonly employed. A linear regulator based battery charger comprises an active device acting like a variable resistor. By forcing a voltage drop on the active device, the linear regulator based battery charger can regulate either its output voltage or its output current. On the contrary, a switching regulator based battery charger regulates its output voltage or current by adjusting a duty cycle controlling the turn-on period of a switching element of the charger. In comparison to the linear regulator based battery charger, the switching regulator based battery charger usually provides a high efficiency charging process.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a buck switching regulator based battery charger. The invention may also be applied, however, to a variety of battery chargers having different power topologies.

Figure 1:
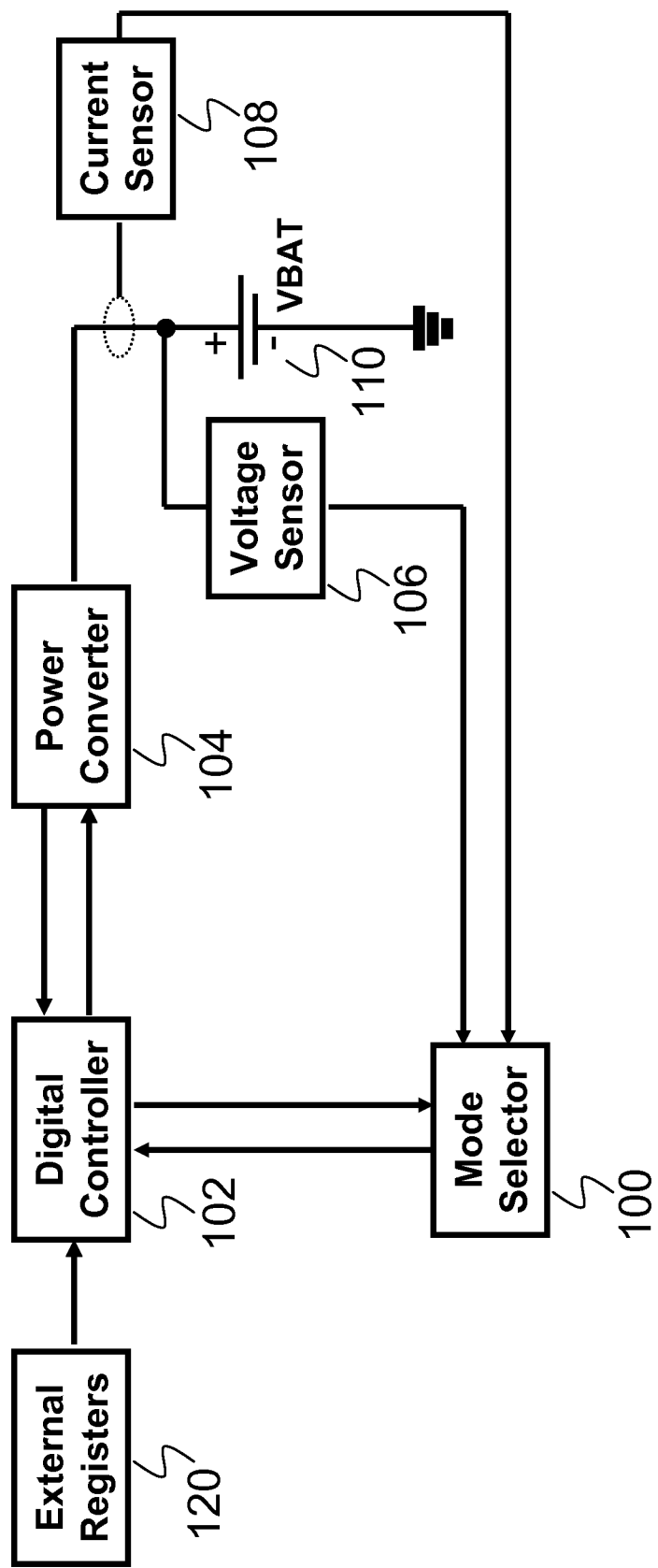
FIG. 1 illustrates a digital controlled battery charger in accordance with an embodiment.

Referring initially to FIG. 1, a digital controlled battery charger is illustrated in accordance with an embodiment. The digital controlled battery charger comprises a power converter 104, a voltage sensor 106, a current sensor 108, a mode selector 100 and a digital controller 102. The power converter 104 receives a control signal from the digital controller 102. The voltage sensor 106 and the current senor 108 are coupled to the output of the power converter 104 and sense the voltage across a rechargeable battery 110 tied to the output of the power converter and the current flowing through the rechargeable battery 110 respectively. Both the output of the current sensor 108 and the output of the voltage sensor 106 are sent to the mode selector 100 in which based upon a control signal from the digital controller 102, a logic control unit (not shown) of the mode selector 100 selects one of two input signals and forwards the selected signal to the digital controller 102. As shown in FIG. 1, the digital controller 102 is configured to receive an external signal from external registers 120 at a first input, a control signal from the mode selector 100 at a second input and some operating parameters from the power converter 104 at a third input. Based upon such three input signals, the digital controller 102 generates a pulse width modulated (PWM) signal to control the power converter 104 accordingly.

The power converter 104 converts an input voltage (not shown but illustrated in FIG. 2) into a regulated output voltage for charging the rechargeable battery 110. In response to the PWM signal generated from the digital controller 102, the power converter 104 adjusts its output voltage accordingly. As known in the art, the operation of the power converter 104 is within the skills of persons of ordinary skill in the art, and thus the operation of the power converter 104 will be not presented in detail. It should be noted that while the preferred embodiment of the power converter 104 is a buck switching mode converter, the present invention is applicable to other power topologies such as boost switching mode converters, buck-boost switching mode converters, linear regulators and the like. It should be further noted that the present invention is also applicable to a variety of derivatives of the power topologies described above. For example, the scope of the present invention may extend to a forward isolated converter because the forward isolated converter is derived from the buck switching mode converter.

In a constant current phase of a charging cycle, the current flowing through the rechargeable battery 110 is used as feedback for controlling the operation of the battery charger. The current sensor 108 is employed to generate a current sense signal proportional to the current flowing through the rechargeable battery 110 by means of a variety of current sensing techniques. The current sensor 108 can be implemented by connecting a sense resistor in series with the rechargeable battery 110. Furthermore, if the amplitude of the current sense signal is too small, the sense resistor can be connected across the inputs of an operational amplifier (not shown but illustrated in FIG. 2) so that the operational amplifier can amplify the current sense signal proportionally to an acceptable level for subsequent circuits. Likewise, a Hall effect device, a magneto resistive sensor, a current sense integrated circuit or the like can be employed to detect the current flowing through the rechargeable battery 110.

In a constant voltage phase of a charging cycle, the voltage across the rechargeable battery 110 is used as feedback for controlling the operation of the battery charger. The voltage sensor 106 is utilized to detect the voltage across the rechargeable battery 110 and convert the voltage proportionally to an acceptable signal for the subsequent circuits. While the preferred embodiment of the voltage sensor 106 is a resistive divider connected between two terminals of the rechargeable battery 110, other voltage sensing techniques such as capacitive dividers, voltage dividers formed by a variety of transistors, voltage sense integrated circuits or the like are within the scope of the present invention.

In a charging cycle, the battery charger provides a constant current first and a constant voltage after the rechargeable battery 110 reaches a threshold voltage. The mode selector 100 is utilized to select an input signal (e.g., sensed voltage from the voltage sensor 106) and forward the selected signal to the digital controller 102. It should be noted that while the mode selector 100 illustrated in FIG. 1 is a separate device, it can be an integrated part of the digital controller 102. It should be further noted that the signal selection process can be performed either in hardware or software or some combination thereof. In a preferred embodiment, however, the function is performed by a process such as executing a computer program on a digital signal processor or a central processing unit in accordance with code such as computer program code or software.

The digital controller 102 may receive an external signal from the external registers 120. According to an embodiment, the external registers may comprise a bank of registers, which are communicated to the digital controller through a digital interface (e.g., I2C, SPI or UART). Alternatively, the external signal may be a dynamic system configuration adjustment signal from a user or a system management unit. The external signal can be used to program a variety of parameters of the digital control 102. In addition, the digital controller 102 may retrieve the operating parameters of the power converter 104 and receive feedback from the mode selector 100. Based upon these three signals, the digital controller 102 generates a digital PWM signal for controlling the power converter 104. The operation of the digital controller 102 will be described in detail with respect to FIG. 2. An advantageous feature of the digital controller 102 is that the digital controller 102 can be configured to dynamically adjust control loop compensation parameters when the battery charger enters a different charging phase. Moreover, a dynamic adjustment through a digital control loop may make dynamic compensation against process variations possible. Furthermore, such a dynamic adjustment reduces the hardware cost of the battery charger because a single controller (e.g., digital controller 102) is capable of handling both the constant current charge and the constant voltage charge.

Figure 2:
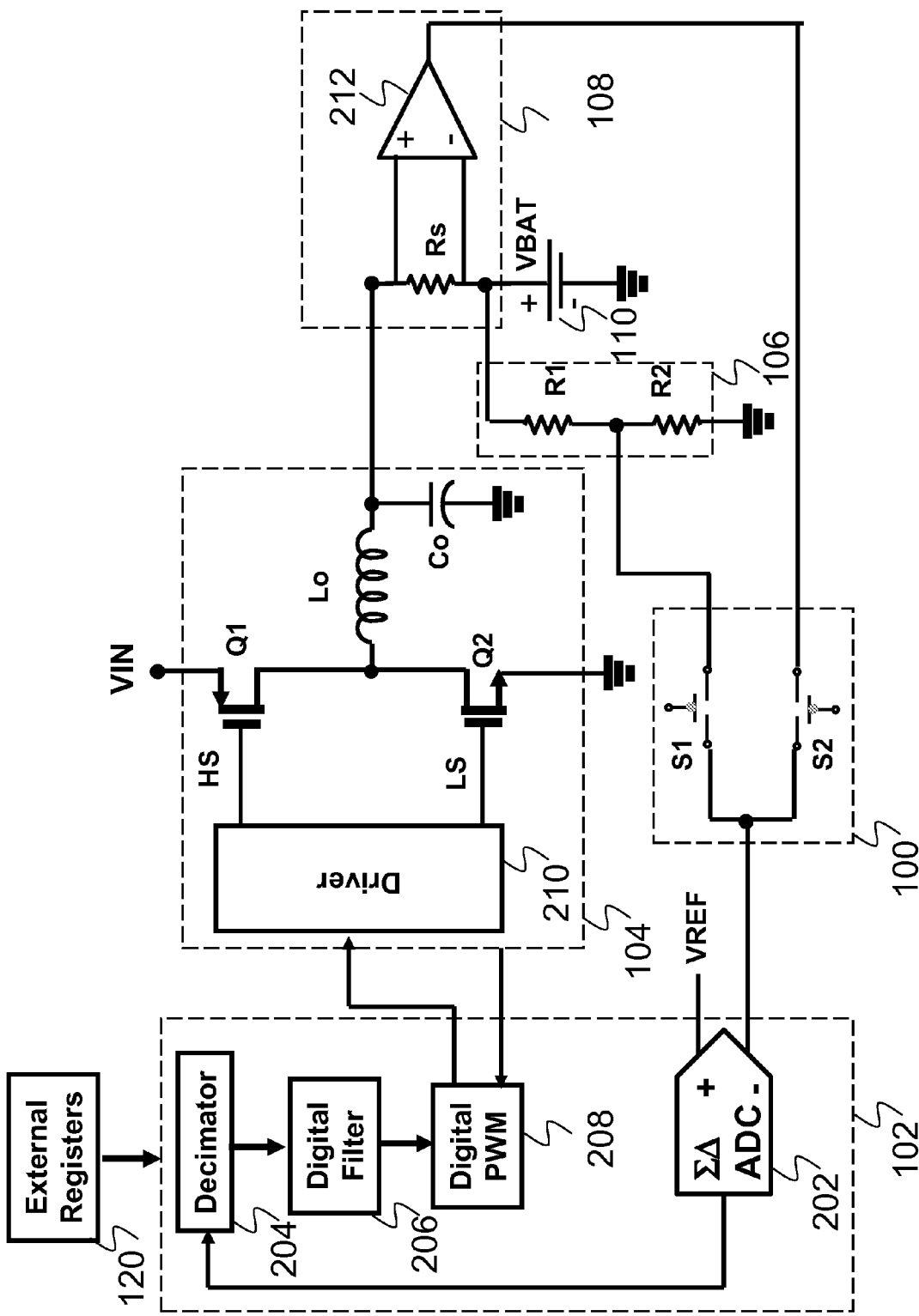
FIG. 2 illustrates a simplified block diagram of a digital controlled battery charger.

FIG. 2 illustrates a simplified block diagram of a digital controlled battery charger in accordance with an embodiment. According to an embodiment, the power converter 104 is a buck switching mode converter comprising a P-FET Q1 connected in series to an N-FET Q2. A junction point between the P-FET Q1 and the N-FET Q2 is connected to the rechargeable battery 110 via a filter formed by an output inductor Lo and an output capacitor Co. The gates of the P-FET Q1 and the N-FET Q2 are coupled to a driver 210, which receives a digital PWM signal from the digital controller 102 and converts the digital PWM signal to two complimentary gate signals with minimum dead time. As known in the art, the driver 210 not only generates two complimentary gate signals from the digital PWM signal the driver 210 receives, but also supplies enough current to increase sink and source capability when the driver 210 turns on or off the switching elements of the power converter 104. Q1 and Q2 can be implemented by other types of devices, such as a J-FET, HEX-FET, Bi-polar transistors, as known by any persons having ordinary skill in the art.

In this example implementation, a sense resistor Rs is utilized to detect the current flowing through the rechargeable battery 110. Rs is serially connected to the rechargeable battery 110. An operational amplifier 212 has two inputs connected to two terminals of Rs. The gain of the operation amplifier 212 is arranged such that the output voltage of the operational amplifier 212 falls into the same range as the output of the voltage sensor 106. As a result, the feedback signal from the voltage sensor 106 and the feedback signal from the current sensor 108 can share a reference voltage when the mode selector selects either one and forwards the selected signal to the digital controller 102 wherein the selected signal will be compared with the reference voltage.

The charging cycle of a rechargeable battery comprises at least two phases, namely, a constant current phase and a constant voltage phase. The mode selector 100 is used to select a proper feedback signal during these two charging phases. This function can be performed either in hardware or in software. For example, an ORING circuit can ensures that a feedback signal having a high amplitude passes the mode selector 100 and the feedback signal having a low amplitude is blocked from reaching the digital controller 102. Alternatively, the mode selection function can be integrated into the digital controller 102 wherein a computer program can compare two input signals and select a signal having a high amplitude.

The digital controller 102 comprises a sigma delta analog-to-digital converter (ADC) 202, a decimator 204, a digital filter 206 and a digital PWM generator 208. The sigma delta ADC 202 allows for a simple switched capacitor design to provide rejection of the common mode of the incoming signals, while still providing the differential gain necessary for the conversion to the digital domain. According to an embodiment, the sigma delta ADC 202 receives the feedback signal from the mode selector 100 and compares the feedback signal to a reference voltage VREF. Furthermore, the sigma delta ADC 202 converts the difference between the reference voltage VREF and the feedback signal to a digital number. It should be noted that while in FIG. 2 the sigma delta ADC 202 comprises a differential amplifier, the sigma delta ADC 202 can be replaced by two separate devices, namely, a differential amplifier device and an ADC.

The decimator 204 is configured to perform two functions. First, the decimator 204 is used to reduce the sampling rate of the digital signal from the sigma delta ADC 202. By employing this technique, the data rate of the size of data at the output of the decimator 204 is reduced while the Shannon-Nyquist sampling theorem criterion is still maintained. Additionally, the decimator 204 provides an anti-aliasing filter in which the quantization noise is reduced, and thus the resolution of the signal at the output of the decimator 204 is improved. The decimator 204 may be implemented by using a simple digital counter in which the number of logic ones coming out of the sigma delta ADC 202 is counted during the previous period and a new digital number is generated based upon the number of logic ones.

The digital filter 206 is used to place compensation poles and zeros so that the loop response of the constant current control and constant voltage control of the battery charger can be controlled. In other words, after adding extra poles and zeros via the digital filter 206, the control loop of the battery charge has a phase margin greater than sixty degrees. As known in the art, when the battery charger is under a constant current charging phase, the transfer function of the battery charger is a second-order system. More particularly, the transfer function comprises two conjugate poles and a zero. As known in the art, in order to ensure that a second-order system has a phase margin greater than sixty degrees, in an analog battery charger, resistors and capacitors are configured to provide three-poles and two-zeros via an error amplifier. Like its analog counterpart, the digital filter 206 can provide three poles and two zeros so that the loop response of the battery charger has a phase margin greater than sixty degrees. In accordance with an embodiment, the digital filter 206 provides two zeros at the frequency of the two conjugate poles of the transfer function so that the phase lag due to the two conjugate poles can be mitigated. A pole can be placed at a frequency beyond the crossover frequency so that high frequency noise can be attenuated.

On the other hand, when the battery voltage reaches a threshold voltage, the battery charger enters a constant voltage phase. The battery charger under the constant voltage phase shows a transfer function similar to the two-order system described above with respect to the constant current phase. In sum, the constant current charging phase and constant voltage charge phase share the similar transfer function despite that the poles and zeros may be located at different frequencies. This inherent feature indicates that both charging phases can share a digital filter such as a recursive filter. When the battery charger enters a different charging phase, the digital filter 206 is capable of compensating the control loop by dynamically adjusting its coefficients so that compensation zeros and poles can be adjusted accordingly. An advantageous feature of the digital filter 206 is that two charging phases of the battery charger can share the same filter configuration. Additionally, the control loop can be tuned in response to either an external signal or the change of battery charger's operating conditions so that the control loop can provide a stable system as well as a fast transient response.

The digital PWM generator 208 receives a digital number from the digital filter 206 and generates a constant frequency PWM signal. The digital PWM generator 208 can be implemented by using a digital counter (not shown). Such a digital counter allows the digital PWM generator 208 to output a logic high state until the digital counter counts up to the value equivalent to the digital number from the digital filter 206. After that, the output of the digital PWM generator 208 remains a logic low state until the next switching cycle. The output of the digital PWM 208 is connected to the driver 210, which generates two gate pulses to drive the buck converter shown in FIG. 2. The operation of controlling a buck converter through PWM control is known in the art, and hence not discussed herein.

Figure 3:
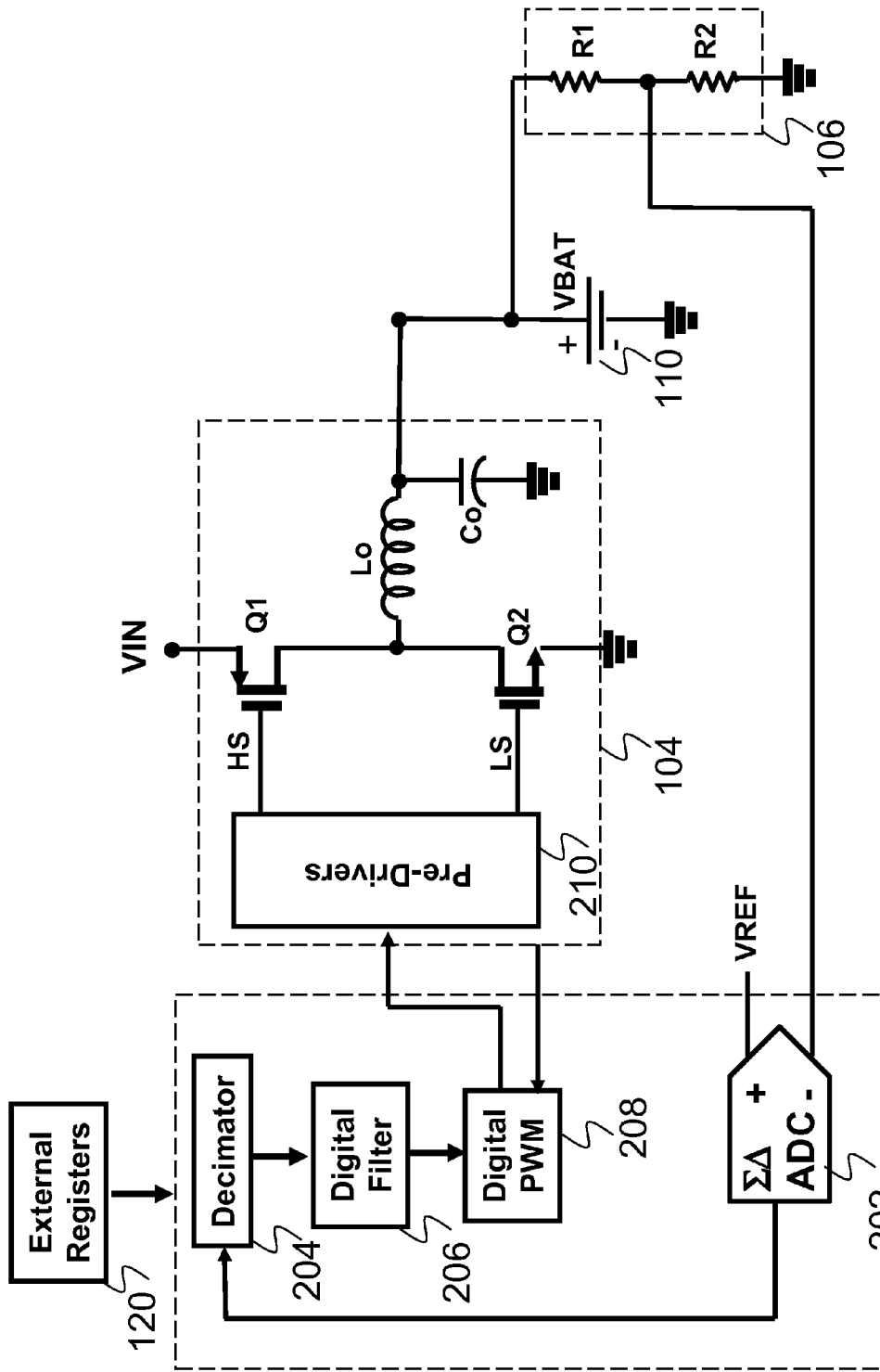
FIG. 3 illustrates a simplified block diagram of a digital controlled battery charger in accordance with another embodiment.
Figure 4:
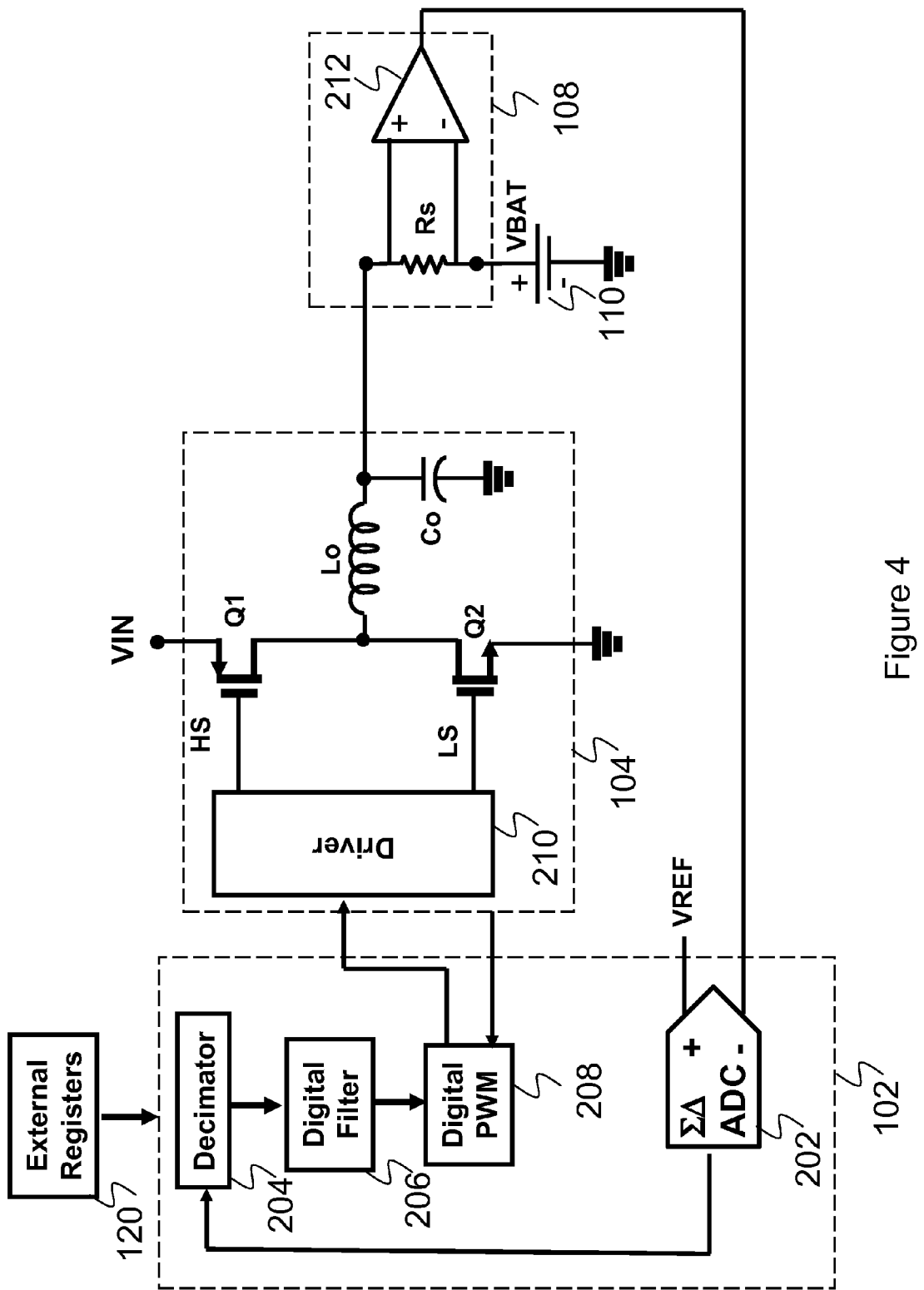
FIG. 4 illustrates a simplified block diagram of a digital controlled battery charger in accordance with yet another embodiment.

FIG. 3 illustrates a simplified block diagram of a digital controlled battery charger in accordance with another embodiment. The battery charger shown in FIG. 3 is similar to the embodiment in FIG. 3, but only comprises a single voltage feedback loop. FIG. 4 illustrates a simplified block diagram of a digital controlled battery charger in accordance with yet another embodiment. The battery charger shown in FIG. 4 comprises a single current feedback loop. The operation of voltage mode battery chargers or current mode battery chargers is known in the art, and hence not discussed herein. Both FIG. 3 and FIG. 4 illustrate the scope of the present invention is applicable to dual-loop battery chargers as well as single-loop battery chargers. A person having ordinary skill in the art would recognize many variations, alternatives and modifications.

Figure 5:
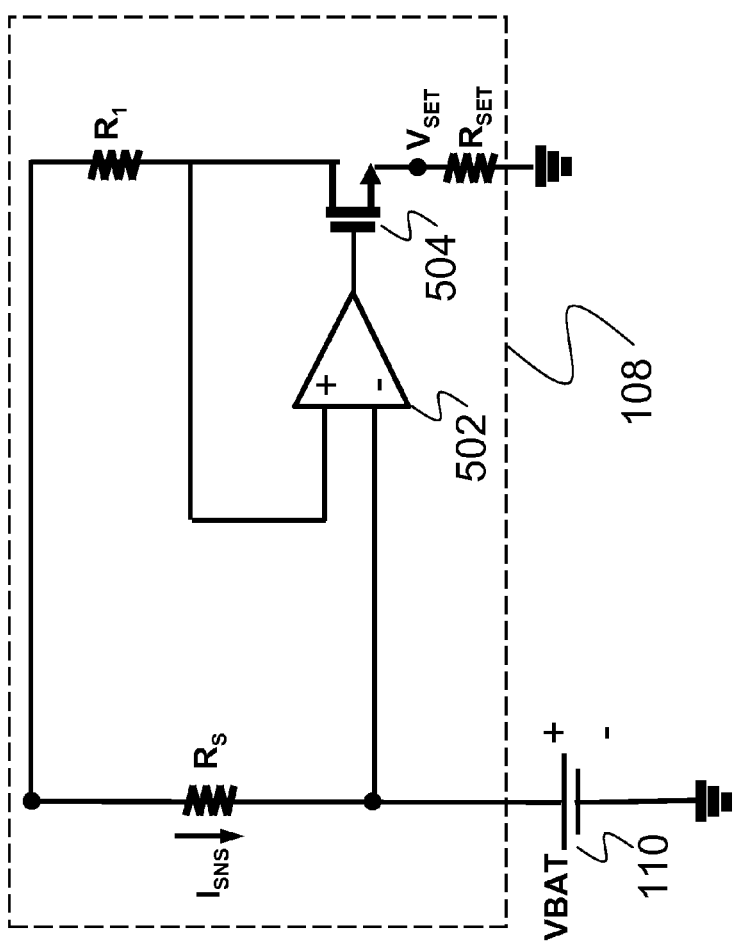
FIG. 5 illustrates a simplified block diagram of one embodiment of the current detector used in the battery charger.

FIG. 5 illustrates a schematic diagram of the current sensor 108 shown in FIG. 4. According to an embodiment, the current sensor 108 comprises a sense resistor Rs, an operation amplifier 502, a resistor R1, a current sense voltage setting resistor Rset and a transistor 504. The sense resistor Rs is connected in series with the rechargeable battery 110. The resistor R1, the transistor 504 and the current sense voltage setting resistor Rset are connected in series. The operational amplifier 502 has a positive input connected to the junction point between the resistor R1 and the transistor 504, a negative input connected to the junction point between the current sense resistor Rs and the rechargeable battery 110, and an output connected to the gate of the transistor 504.

As it is known in the art, the voltage across the sense resistor Rs is equal to the voltage across the resistor R1. As shown in FIG. 5, the current flowing through the resistor R1 is approximately equal to the current flowing through the current sense voltage setting resistor Rset. As a result, the voltage across the resistor R1 can be expressed as follows:

$$V_{R1} = \frac{V_{SET}}{R_{SET}} \cdot R_1 \qquad (1)$$

where Vset is the voltage across the current sense voltage setting resistor Rset. Similarly, the voltage across the sense resistor Rs can be expressed as follows:

$$V_{Rs} = I_{SNS} \cdot R_S \qquad (2)$$

where $I_{SNS}$ is the current flowing through the sense resistor Rs. Because the voltage across the sense resistor Rs is equal to the voltage across the resistor R1, Vset can be expressed as follows:

$$V_{SET} = I_{SNS} \cdot \frac{R_S}{R_1} \cdot R_{SET} \qquad (3)$$

from the equation shown above, Vset is proportional to the current sense voltage across the sense resistor Rs. In addition, the range of Vset can be adjusted by changing the value of Rset. One advantageous feature of the current sensor 110 shown in FIG. 5 is that the current sensor 110 can generate a current sense signal (e.g., Vset) on the same order as the voltage feedback signal. This feature ensures that the current feedback loop and the voltage feedback loop can share an ADC (e.g., sigma delta ADC 202 shown in FIG. 2) and a reference voltage.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A digital control circuit comprising:
   a mode selector being configured to receive both a current sense signal and a voltage sense signal;
   an analog-to-digital converter (ADC) coupled between the mode selector and a digital controller; and
   the digital controller being configured to generate a digital pulse width modulated (PWM) signal.

2. The digital control circuit of claim 1, wherein the mode selector selects an input signal and forwards the input signal to the ADC.

3. The digital control circuit of claim 1, wherein the ADC comprises a sigma delta ADC and a differential amplifier.

4. The digital control circuit of claim 1, further comprising:
   a decimator coupled between the ADC and a digital filter;
   the digital filter being configured to add a plurality of poles and zeros to increase a power converter's phase margin; and
   a digital PWM generator receiving a digital signal from the digital filter and converting the digital signal to the PWM signal.

5. The digital control circuit of claim 4, wherein the digital filter adds multiple poles and multiple zeros to increase the power converter's phase margin.

6. The digital control circuit of claim 1, wherein a digital filter is configured such that:
   a first group of coefficients is enabled when the current sense signal is selected; and
   a second group of coefficients is enabled when the voltage sense signal is selected.

7. The digital control circuit of claim 1, wherein the ADC is configured to receive a reference voltage and a feedback signal from the mode selector.

8. A system comprising:
   a power converter having an output coupled to a rechargeable battery;
   a current sensor being configured to detect a current flowing through the rechargeable battery;
   a voltage sensor being configured to detect a voltage across the rechargeable battery; and
   a digital control circuit comprising:
      a mode selector being configured to receive both a current sense signal from the current sensor and a voltage sense signal from the voltage sensor;
      an analog-to-digital converter (ADC) coupled between the mode selector and a digital controller; and
      the digital controller being configured to generate a digital pulse width modulated (PWM) signal.

9. The system of claim 8, further comprising:
   a sense resistor connected in series with the rechargeable battery;
   a current sense amplifier having two inputs across the sense resistor; and
   a driver coupled between the digital controller and the power converter.

10. The system of claim 8, wherein the power converter is selected from the group consisting of a buck switching mode converter, a boost switching mode converter, a buck-boost switching mode converter, a linear regulator, a forward converter, a full bridge converter and a half bridge converter.

11. The system of claim 8, wherein the current sensor and the voltage sensor are configured such that:
   a current sense signal from the current sensor and a voltage sense signal from the voltage sensor share a reference voltage.

12. The system of claim 8, wherein the digital controller is configured to receive an external signal through which a user dynamically adjusts the digital controller.

13. The system of claim 8, further comprising:
   a decimator coupled between the ADC and a digital filter;
   the digital filter being configured to add a plurality of poles and zeros to increase the power converter's phase margin; and
   a digital PWM generator receiving a digital signal from the digital filter and converting the digital signal to the PWM signal.

14. The system of claim 8, wherein the current sensor is selected from the group consisting of a sense resistor, a Hall effect device, a magneto resistive sensor, a current sense integrated circuit.

15. A method comprising:
   detecting a current flowing through a rechargeable battery and converting the current to a current sense signal;
   detecting a voltage across two terminals of the rechargeable battery and converting the voltage to a voltage sense signal;
   determining a selected signal from the current sense signal and the voltage sense signal and forwarding the selected signal to a digital controller;
   generating a digital pulse width modulated (PWM) signal; and
   sending the PWM signal to a power converter coupled to the rechargeable battery.

16. The method of claim 15, further comprising:
   comparing the selected signal with a reference voltage and converting an error between the selected signal and the reference voltage to a digital number by using an analog-to-digital converter (ADC);
   compensating a digital control loop by adding a plurality of poles and zeros via a digital filter.

17. The method of claim 15, further comprising:
   reducing data size by using a decimator coupled between the ADC and the digital filter.

18. The method of claim 15, further comprising sending the PWM signal to a driver to control the power converter.

19. The method of claim 15, further comprising adjusting the digital controller by using an external signal from a user or a system management unit.

20. The method of claim 15, further comprising:
   receiving operating parameters from the power converter;
   receiving an external signal; and
   generating the PWM signal in consideration of the operating parameters and the external signal.

21. The method of claim 20, where the operating parameters are selected from the group consisting of an input voltage coupled to the power converter, an operating temperature of the power converter, a voltage across a switching element of the power converter, an input current of the power converter, an output current of the power converter, an output voltage of the power converter, a current flowing through an inductor of the power converter, an input ripple voltage of the power converter, an output ripple voltage of the power converter, an input voltage change of the power converter and an output voltage change of the power converter.

22. The method of claim 20, where the external signal includes battery parameters comprising:
- an open circuit voltage;
- a charging current limit; and
- an equivalent load resistor.

\* \* \* \* \*